United States Patent Office 3,502,599
Patented Mar. 24, 1970

3,502,599
REGENERATION OF ANION EXCHANGE RESINS STRATIFIED BY FLOTATION
William Fries, Philadelphia, Pa., assignor to Rohm and Haas Company, Philadelphia, Pa., a corporation of Delaware
No Drawing. Filed Sept. 20, 1967, Ser. No. 669,256
Int. Cl. B01d 15/06
U.S. Cl. 260—2.1          1 Claim

ABSTRACT OF THE DISCLOSURE

Process for simultaneously regenerating exhausted mixtures of strong and weak base anion exchange resins having some difference in density between them when in the regenerated form, which difference essentially disappears when in the exhausted form. The regenerant medium causes flotation of the lighter regenerated resin which then settles in separate strata upon the more dense regenerated resin.

---

This invention relates to a method of improving the performance or functional capacity of anion exchange materials. More particularly, this invention is directed to an anion exchanging system employing a mixed bed of both strongly basic and weakly basic anion exchange resins. Still more particularly, this invention is concerned with a method of improving the efficiency of such systems in terms of their resins' ion exchange capacity and cost of regenerants for the resins.

BACKGROUND OF THE INVENTION

Field of the invention

Anion exchangers in the active basic form are commonly used to remove acids from water solutions. After exhaustion of the exchangers the adsorbed acids on the exchangers may be removed by means of basic solution. The exchangers thereby are regenerated to the active basic form and corresponding salts of the adsorbed acids are formed with the regenerant base. These salts are washed out of the regenerated basic exchange material which is substantially insoluble. More details concerning conventional ion exchange practices, and methods for regenerating anion exchange resins, may be found in U.S. Patents 2,599,558 and 2,884,384 among many others.

Although ion exchange is most frequently practiced with columns or beds of a single resin, there has come into use for certain applications what has been called mixed beds. These generally consist of two or more types of resin, in a single column, normally comprising at least one anion exchange resin and one cation exchange resin. Of more recent origin has been the development of an ion exchange column containing at least two anion exchange resins of different basic strengths, e.g. one considered a strongly basic ion exchanger and one known as a weakly basic ion exchanger. An explanation of the differences of basicity of such exchangers, and the chemistry thereof, is set forth in some detail in U.S. Patent 2,917,368, and that explanation is incorporated herein by reference thereto. The column disclosed in that patent, incidentally, is not a mixed bed system as the weakly and strongly basic resins are kept separated by means of a fine screen. Examples of strongly basic resins available in commerce are those known to the trade as Amberlite IRA-402, Amberlite IRA-900, Dowex-1, and Dowex-2.

Examples of weakly basic resins available in commerce are those known to the trade as Amberlite IR-45, Amberlite IRA-93, and Dowex-3.

Description of the prior art

The prior art has known that it is best to remove organic material by means of weakly basic resins, if it is at all possible to do so, since adsorbed organics can be more easily eluted from a weakly basic resin than from a strongly basic resin. Another reason for preferentially using weakly basic resins, moreover, is that they have a higher capacity for strong acids and a higher regeneration efficiency than do strongly basic anion exchange resins. Since organic impurities are not easily eluted from strongly basic resins they have the fault of being subject to fouling readily by such impurities in the solution being treated, whereas many of those same impurities do not significantly interfere with the ion exchanging functions of weakly basic resins.

It has also been well known in the art to utilize a unit of a weakly basic resin in the free base form, followed by a unit of a strongly basic resin in the hydroxide form, to achieve maximum ion exchanging efficiency (i.e. ion exchanging capacity per unit volume of resin) for acid removal with minimum cost for regenerant chemicals. However, such a system has had the disadvantage of requiring the use of two separate pieces of ion exchange equipment instead of one, and the concomitant high capital cost has been a serious impediment to the system's widespread adoption.

An obvious way in which this same desired result might be achieved is to utilize a mixture of weakly basic and strongly basic anion exchange resins, and this has been tried. Experience has shown, however, that for a given amount of regenerant chemicals such a system does not have as much capacity for removing a combination of strongly and weakly acidic materials as does an equivalent size two-unit system. Consequently, any cost-saving achieved by utilizing a single unit is offset by a much greater cost for regenerants which are required to obtain the same amount of ion exchanging capacity out of the comparable two-unit system.

Notwithstanding the existence of this body of knowledge concerning the use of combinations of strongly and weakly basic anion exchangers in sequential or mixed beds there has long been felt the need for increasing the ion exchange capacity of the resin pairs. In addition, there has also been felt the need for minimizing organic fouling of the strongly basic anion exchange resins which are operating on water containing organic materials. Until the invention disclosed in copending U.S. application Ser. No. 532,869, filed on Mar. 9, 1966 by Downing, Brock and Hetherington there had been known no way of attaining the desired increase in capacity, minimization of organic fouling of the strongly basic anion exchange resins, and improvement in efficiency beyond the limits characteristic of a given pair of resins. Their invention consisted of a technique whereby the strong and weak base resins, which are homogeneously mixed together when in the exhausted state, are stratified into separate layers with the strongly basic resin below and the weakly basic resin on top of the strong base resin. The present invention accomplishes the same result, but does so in an improved manner and is capable of functioning in situations which the Downing et al. invention cannot operate.

The present invention, in addition to representing an improvement over the Downing et al. process, also constitutes an advance in the art over the disclosure by Hetherington and Fries in their U.S. application Ser. No. 669,255, filed on even date with this application and in the hands of a common assignee. To understand the present invention, and to appreciate the improvement in the art it has made with reference to the disclosures in copending U.S. Ser. Nos. 532,869 and 669,255, as well as the art which preceded those developments, it will be helpful to first review the essence of the conventional practice in vogue before the inventions of those two cases were made.

The problem with which the prior art (as well as the present invention) has been concerned involves the use in a column of a substantially homogeneous mixture of a weakly basic anion exchanger in the free base form, and a strongly basic anion exchanger in the hydroxide form. A sample to be treated, such as water from which it is desired to remove weak acids such as $H_2CO_3$ and $H_2SiO_3$ and strong acids such as $H_2SO_4$, $HCl$ and various organic acids, is passed downflow through the mixture. In the mixed resin condition of the bed the acids will indiscriminately come into contact with both the weakly basic and the strongly basic anion exchangers, causing the "unprotected" strongly basic resin to pick up strong acids, weak acids and organic impurities so as to hasten exhaustion of the ion exchanging capacity thereof.

When leakage of silica past the resins occurs a backwashing procedure is employed, this procedure consisting in sending a liquid up-flow through the mixture of resins in the column, the liquid passing out of the column near its top while the resins fall back into place inside the column after the back-washing step is finished. This backwash serves to remove impurities loosely held in the bed as well as air bubbles entrapped therein. As a result of this backwash the two resins become intimately mixed due to the fact that when those resins are in the exhausted state their respective densities are practically the same. Caustic or other suitable basic regenerant then is added at the top of the column and sent downflow through the resins so as to regenerate them and place them in condition for the next liquid-treating cycle.

The thus backwashed exhausted resins remain in a substantially homogeneously mixed state, both prior and subsequent to the regeneration step which follows. As such, they are subject to the disadvantage explained above, namely possession of a lower capacity in comparison with the equivalent amount of resins employed in a sequential two-column system.

Downing et al. discovered that if, after this regeneration step, another backwashing step is employed, the mixture of resins becomes stratified in separate layers with the more dense strongly basic resins below and the less dense weakly basic resins above. They also discovered that the thus treated resins possessed a marked increase in ion exchange capacity for mixtures of weak and strong acids in comparison with the practice which was conventional before their discovery.

The prior art Downing et al. and Hetherington et al. processes work very well, but there are situations in which neither would be the preferred modus operandi. For example, in the former case a backwash is employed after regeneration, and there are some treatment cycles where such a backwash would present other undesirable problems. In the latter case it is normally necessary to rinse directly after regeneration, and in some situations this would not be desirable. The present invention eliminates those problems by eliminating both requirements.

Summary of the invention

The present invention can preferably be practiced in two alternative procedures. It involves simultaneous regeneration of two resins, the weak and the strong base resins with any base. It requires the existence of some density difference between the two resins, no matter how small. It depends upon the flotation of the lighter resin by means of the regenerant medium used, the idea being that, after both resins are fully regenerated and before the excess regenerant is drawn off or rinsed out, the excess regenerant is allowed to remain long enough to float the resins until a separation of the lighter from the heavier one is caused to occur. A critical requirement is that the regenerant used, generally being caustic, has a density under actual use conditions which will have a value intermediate the respective densities of the weak and strong base resins.

One alternative procedure is to introduce the regenerant downflow in the column, leave the residual regenerant in place until the resins are separated, then use a small upflow water rinse to raise the resins off the bottom of the column with the lighter resin moving upwards and the heavier resin remaining on the bottom, and then follow with a normal rinse to remove the excess regenerant from the colum before going into the ion exchanging service cycle.

The other alternative is to pass the regenerant up-flow in the column, thereby lifting both resins in the liquid in the liquid stream and simultaneously separating and regenerating both resins, and in the settling period which follows the more dense resin settles first and the lighter resin settles on top of the more dense resin.

EXAMPLE

Two ion exchange columns were employed which had been in operation for about six months in a two bed deionization system for treating a poor quality surface water. Each consisted of a Stratabed, i.e. separate layers, of 75% Amberlite IRA–402 (a strongly basic, quaternary ammonium, styrene-divinylbenzene type anion exchange resin) in the hydroxide form, and 25% Amberlite IRA–93 (a weakly basic, tertiary amine, styrene-divinylbenzene type anion exchange resin) in the free amine form. In these forms the density difference between the resins, when new, is great enough to allow separation and stratification of the beds when backwashed. The resins in both columns had reached the point where, as a result of extensive organic fouling of the weak base resin, there was essentially no difference between the densities of both resins, and separation of the resins became almost impossible.

(A)

A 4% NaOH solution was passed entirely down through one column. The volume of caustic was more than sufficient to fully regenerate both resins in the column to the hydroxide form. The flow of caustic was stopped at the point where the liquid level was slightly above the resin level.

A backwash of water was employed at this point, followed by a downflow water rinse. During this backwash the IRA–93 floated to the top of the column while the heavier IRA–402 remained below. After the final water rinse the IRA–93 fell downward to form a separate layer on top of the IRA–402 layer, at least about 80% of the IRA–93 being in the upper layer.

(B)

A 4% NaOH solution was passed upflow in the column, thereby causing the resins to rise upwards immediately, with the lighter IRA–93 resin floating to the top of the column. Regeneration of both the IRA–93 and IRA–402 resins takes place at this point in the flotation cycle. As in the previous experiment the volume of caustic employed was more than sufficient to fully regenerate both resins in the column to the hydroxide form. The upflow of caustic was stopped after regeneration was completed, and a downward water rinse employed. The heavier IRA–402 resins fell first, followed by the lighter IRA–93 resins which settled on top of the former as a distinct and separate layer. Approximately 80% of the IRA–93 resin was in the upper layer.

I claim:
1. The process of improving the ion exchange capacity of a mixture of less dense weakly basic and more dense strongly basic anion exchange resins in a column, and to minimize fouling of the strongly basic anion exchange resins by organic materials in water being treated by the resins, which process consists in simultaneously regenerating the weak base and strong base resins, the regeneration being accomplished by introducing downflow in the column an aqueous caustic solution whose density is intermediate the respective densities of the two resins in use condition, leaving in the column an amount of regenerant in excess of the amount required to effect complete regeneration of the resins whereby the resins are separated from one another by flotation, then using an upflow aqueous wash to raise up in the column the lighter weak base resin which has been caused to float on the regenerant while the heavier strong base resin remains below since it is more dense than the regenerant, and following with a water rinse downflow to remove excess regenerant and facilitate settlement into separate strata of the lowermost strong base resin layer and the uppermost weak base resin layer.

References Cited

UNITED STATES PATENTS

| | | | |
|---|---|---|---|
| 2,666,741 | 1/1954 | McMullen | 210—24 |
| 2,917,368 | 12/1959 | Juda | 23—185 |
| 2,999,821 | 9/1961 | Fisher | 260—2.1 |
| 3,197,401 | 7/1965 | Arai | 210—30 |

OTHER REFERENCES

Helfferich: Ion Exchange, 1962, New York, McGraw-Hill, pp. 232–233, 429 and 431.

Rohm & Hass: Amberlite Laboratory Guide, 1964, Philadelphia, p. 10.

Dowex: Ion Exchange, Dow Co., Midlands, Mich., 1964, p. 57.

WILLIAM H. SHORT, Primary Examiner

M. GOLDSTEIN, Assistant Examiner

U.S. Cl. X.R.

210—31, 32, 35